United States Patent
Ryu et al.

(10) Patent No.: US 8,034,491 B2
(45) Date of Patent: Oct. 11, 2011

(54) ORGANIC ELECTROLYTIC SOLUTION AND LITHIUM BATTERY EMPLOYING THE SAME

(75) Inventors: Young-gyoon Ryu, Suwon-si (KR); Eun-sung Lee, Seoul (KR); Jae-young Choi, Suwon-si (KR); Seok-soo Lee, Suwon-si (KR); Su-jin Kim, Gunpo-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1019 days.

(21) Appl. No.: 11/488,215

(22) Filed: Jul. 17, 2006

(65) Prior Publication Data

US 2007/0020529 A1    Jan. 25, 2007

(30) Foreign Application Priority Data

Jul. 20, 2005    (KR) .................. 10-2005-0065715

(51) Int. Cl.
*H01M 6/16* (2006.01)
*H01M 6/04* (2006.01)
(52) U.S. Cl. ......... 429/324; 429/325; 429/326; 429/200
(58) Field of Classification Search .................. None
See application file for complete search history.

(56) References Cited

U.S. PATENT DOCUMENTS

| | | | |
|---|---|---|---|
| 5,270,378 | A | 12/1993 | Johnson et al. |
| 5,723,434 | A | 3/1998 | Falk et al. |
| 6,174,628 | B1 | 1/2001 | Umemoto et al. |
| 6,960,410 | B2 | 11/2005 | Kim et al. |
| 2004/0002438 | A1* | 1/2004 | Hawkins et al. ............. 510/417 |
| 2004/0082843 | A1* | 4/2004 | Menon .......................... 600/395 |
| 2004/0096750 | A1* | 5/2004 | Kim et al. .................... 429/326 |
| 2004/0185347 | A1 | 9/2004 | Kim et al. |

FOREIGN PATENT DOCUMENTS

| | | |
|---|---|---|
| CN | 1229529 A | 9/1999 |
| CN | 1501541 A | 6/2004 |
| CN | 1531134 | 9/2004 |
| JP | 08-190912 | 7/1996 |
| JP | 09-092280 | 4/1997 |
| JP | 11-121418 | 4/1999 |

(Continued)

OTHER PUBLICATIONS

China Office action dated Apr. 4, 2008, for China application 2006101061667, with English translation indicating relevance of listed reference in this IDS.

(Continued)

*Primary Examiner* — Barbara Gilliam
*Assistant Examiner* — Kwang Han
(74) *Attorney, Agent, or Firm* — Christie, Parker & Hale, LLP

(57) ABSTRACT

An organic electrolytic solution is provided. The electrolytic solution comprises a lithium salt, an organic solvent comprising a first solvent having a high dielectric constant and a second solvent having a low boiling point, and a surfactant having a hydrophilic segment with two ends, each end being connected to a hydrophobic segment. The organic electrolytic solution effectively prevents the electrolytic solution from contacting the anode of the lithium battery to thereby suppress a side reaction on the surface of the anode. This enhances charge/discharge efficiency, lifespan and reliability of the battery.

10 Claims, 2 Drawing Sheets

FOREIGN PATENT DOCUMENTS

| | | |
|---|---|---|
| JP | 11-126633 | 5/1999 |
| JP | 11-354104 | 12/1999 |
| JP | 2001-043900 | 2/2001 |
| JP | 2001-118578 | 4/2001 |
| JP | 2002-033118 | 1/2002 |
| JP | 2002-319433 | 10/2002 |
| JP | 2003-197263 | 7/2003 |
| JP | 2004-186035 | 7/2004 |
| JP | 2004-525495 | 8/2004 |
| KR | 10-2004-0043228 | 5/2004 |
| WO | WO 2004/088769 | * 10/2004 |

OTHER PUBLICATIONS

Megahed, et al., "Lithium-ion rechargeable batteries," Journal of Power Sources; vol. 51, 1994; pp. 79-104; Elsevier Science S.A.

Yang, et al., "Composition analysis of the passive film on the carbon electrode of a lithium-ion battery with an EC-based electrolyte," Journal of Power Sources; vol. 72, 1998; pp. 66-70; Elsevier Science S.A.

Korean Patent Abstracts, Publication No. 1020040043228 A, dated May 24, 2004, in the name of Myung Cho et al.

Japanese Office action dated Nov. 10, 2009, for corresponding Japanese application 2006-189761, noting listed references in this IDS.

U.S. Office action dated Jul. 22, 2009, for related U.S. Appl. No. 11/357,429.

U.S. Office action dated Feb. 18, 2010, for related U.S. Appl. No. 11/357,429.

Machine translation of Japanese Publication 11-121418, dated Apr. 30, 1999.

Machine translation of Japanese Publication 2004-186035, dated Jul. 2, 2004, previously filed in an IDS dated Jul. 17, 2006.

Kissa, E., Fluorinated Surfactants and Repellents, Surfactant Science Series, vol. 97, Copyright 2001, Marcel Dekker, Inc., p. 2.

Chinese Office action dated Nov. 30, 2007 for Chinese Patent application 200610009267.2 with English translation.

Japanese Office action dated Jul. 21, 2009 for Japanese Patent application 2006-042628.

Japanese Office action dated Jan. 5, 2010 for Japanese Patent application 2006-042628.

Chinese Registration Determination Certificate dated Oct. 14, 2009, for Chinese Patent application 200610009267.2 with English cover sheet.

SIPO Certificate of Patent, dated Jun. 23, 2010, for corresponding Chinese Patent application 200610106166.7, noting listed Chinese reference in this IDS, as well as CN 1501541 and CN 1531134, previously filed in an IDS.

KIPO Office action dated Jan. 29, 2010, for Korean Patent application 10-2005-0130616, noting listed Japanese reference in this IDS, as well as KR 10-2004-0043228, previously filed in an IDS dated Sep. 14, 2007.

* cited by examiner

ORGANIC ELECTROLYTIC SOLUTION AND LITHIUM BATTERY EMPLOYING THE SAME

CROSS-REFERENCE TO RELATED PATENT APPLICATION

This application claims priority to and the benefit of Korean Patent Application No. 10-2005-0065715, filed on 20 Jul., 2005, in the Korean Intellectual Property Office, the entire content of which is incorporated herein by reference.

BACKGROUND OF THE INVENTION

1. Field of the Invention

The present invention relates to a lithium battery, and more particularly, to an organic electrolytic solution that suppresses a side reaction on the surface of an anode to thereby maintain reliability of charge/discharge reactions.

2. Description of the Related Art

Portable electronic devices, such as video cameras, cellular phones, notebook computers, etc., are becoming more lightweight and increasingly improve in performance. As a result, more research is being conducted into batteries for use as power supplies in such portable devices. In particular, chargeable lithium secondary batteries have 3 times as much energy density per unit weight as conventional lead storage batteries, nickel-cadmium batteries, nickel-hydrogen batteries, nickel-zinc batteries, etc., and can be rapidly charged. Thus these chargeable lithium secondary batteries are being actively researched.

In a lithium ion battery, transition metal compounds such as $LiNiO_2$, $LiCoO_2$, $LiMn_2O_4$, $LiFePO_4$, $LiNi_xCo_{1-x}O_2$ (where x=1), $Ni_{1-x-y}Co_xMn_yO_2$ (where $0 \leq x \leq 0.5$, $0 \leq y \leq 0.5$) or oxides thereof containing lithium can be used as cathode active materials and lithium metals, lithium alloys, carbonaceous materials, graphites, etc. can be used as anode active materials.

Electrolytes can be classified as liquid electrolytes and solid electrolytes. When a liquid electrolyte is used, many safety problems arise, such as the risk of fire due to leakage of the electrolytic solution and the breakage of the battery due to vaporization of the electrolytic solution. To address these problems, a solid electrolyte has been proposed for use in place of the liquid electrolyte. Solid electrolytes do not leak and can be easily processed. A lot of research has been conducted into solid electrolytes, such as solid polymer electrolytes. Known solid polymer electrolytes can be classified as complete solid electrolytes containing no organic electrolytic solution and gel-type electrolytes containing an organic electrolytic solution.

Since lithium batteries generally operate at high operating voltages, conventional aqueous electrolytic solutions cannot be used. This is because lithium contained in the anode reacts vigorously with the aqueous solution. Thus, organic electrolytic solutions in which lithium salts are dissolved in organic solvents are used in lithium batteries. To that end, organic solvents having high ionic conductivity and dielectric constants and low viscosity may be used. Since it is difficult to obtain a single organic solvent satisfying these requirements, a mixed solvent is used, which includes an organic solvent having a high dielectric constant and an organic solvent having low viscosity, etc.

In lithium secondary batteries, a passivation layer, such as a solid electrolyte interface ("SEI") film, forms on the negative electrode surface upon initial charging through a reaction of carbon in the anode with the electrolytic solution. The SEI film enables the battery to be stably charged and discharged without further decomposition of the electrolytic solution. Also, the SEI film acts as an ion tunnel through which only lithium ions pass and prevents co-intercalation of organic solvent, which solvates lithium ions and moves with the lithium ions into the carbon anode, thereby preventing a breakdown of the anode structure.

However, upon initial charging, gas is generated inside the battery due to decomposition of the carbonate-based organic solvent during formation of the SEI film. This gas generation results in swelling of the battery. When the lithium battery is stored at high temperature after charging, the passivation layer gradually breaks down due to increases over time in electrochemical energy and thermal energy. This break down of the passivation layer exposes the anode surface and results in increases in the amount of gas generated. Due to the generation of gas, the internal pressure of the battery increases, causing a deformation in the center of a side of the battery. Such deformation may be swelling of a rectangular lithium polymer battery in a certain direction. The increase in internal battery pressure results in a local difference in adherence between electrode plates, thereby reducing the performance and safety of the battery and increasing the difficulties in mounting a set of lithium secondary-batteries.

To address the above problems, a surfactant has been added to the electrolytic solution and adsorbed to the anode to prevent the electrolytic solution from directly contacting the negative electrode, thereby suppressing a side reaction. General cationic, anionic, and nonionic surfactants have been used.

Nonionic surfactants have been proposed for use in the anode to help the re-impregnation of the electrolyte into the anode. During charging and discharging, the electrolyte is squeezed out of the anode due to variations in the volume of the anode. By aiding the re-impregnation of the electrolyte into the anode, the nonionic surfactant prevents depletion of the electrolyte at the anode.

However, most conventional surfactants have structures including a single hydrophobic segment connected to a single hydrophilic segment. When these surfactants are used in the interface between the anode (which mainly includes carbon-based materials having repeating aromatic group structures) and the electrolyte (which mainly includes a carbonate-based solvent), the surfactants do not display good surface active properties due to the differences between the structure of the surfactants and the structures of the anode and electrolyte.

Thus, conventional surfactants have limited use both as barriers between the negative electrode and the electrolyte and as assistants for re-impregnation of the electrolyte into the anode. Therefore, a need exists for an electrolyte including a new surfactant having improved surface active properties in nonaqueous environments.

SUMMARY OF THE INVENTION

In one embodiment of the present invention, an organic electrolytic solution suppresses a side reaction even when charge/discharge cycles are repeated, thereby increasing battery reliability.

In another embodiment of the present invention, a lithium battery employs the electrolytic solution.

According to one embodiment of the present invention, an organic electrolytic solution includes a lithium salt, an organic solvent containing a first solvent having a high dielectric constant and a second solvent having a low boiling point, and a surfactant having a hydrophilic segment with two ends, each of which is connected to a hydrophobic segment.

In the surfactant, at least one hydrogen atom of the hydrophobic segment may be substituted by a halogen atom, or a linear or branched alkyl group having from 1 to 20 carbon atoms. The alkyl group may be substituted by a halogen atom or may remain unsubstituted.

The hydrophobic segment of the surfactant may include an aromatic group. The aromatic group may be an aryl group having from 6 to 30 carbon atoms or a heteroaryl group having from 2 to 30 carbon atoms. Nonlimiting examples of suitable aryl groups having from 6 to 30 carbon atoms include phenyl, indenyl, naphthalenyl, phenanthrenyl, anthracenyl, and pyrenyl. Nonlimiting examples of suitable heteroaryl groups having from 2 to 30 carbon atoms include pyrrolyl, thiophenyl, imidazolyl, pyrazolyl, furanyl, isothiazolyl, pyranyl, isoxazolyl, pyridinyl, purinyl, pyrazinyl, quinolizinyl, pyrimidinyl, quinolinyl, pyridazinyl, indolyl, carbazolyl, and phenazilyl.

The hydrophilic segment of the surfactant may include at least one of an alkoxycarbonyl group (RO—(C=O)—), a carboxy group (HO—(C=O)—), a carbonyl group (—(C=O)—), a dithiocarboxy group (HS—(C=S)—), a thiocarboxy group (HO—(C=S)—), a hydroxy group (HO—), and an oxyalkylene group (—$R^1$—O—). The alkyl group (R—) of the hydrophilic segment may be a linear or branched alkyl group having from 1 to 20 carbon atoms and the alkylene group (—$R^1$—) may be a linear or branched alkylene group having from 2 to 20 carbon atoms.

In one embodiment, the surfactant includes compounds represented by any one of Formulae 1 to 3:

$$Y\text{-}[A]_a\text{-}X \qquad (1)$$

$$Y\text{-}[A]_a\text{-}[B]_b\text{-}X \qquad (2)$$

$$Y\text{-}[A]_a\text{-}[B]_b\text{-}[C]_c\text{-}X \qquad (3)$$

In Formulae 1 to 3, X and Y are each a (hetero)aryl group selected from the group consisting of phenyl and imidazolyl, A, B and C are each a repeating unit selected from the group consisting of oxyethylene, oxypropylene, oxybutylene,

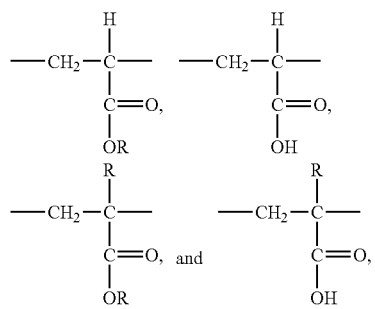

a, b, and c are each an integer ranging from 1 to 100 and R is as defined above.

At least one hydrogen atom of X and Y in the surfactant may be substituted by at least one functional group selected from halogen atoms and linear or branched alkyl groups having from 1 to 20 carbon atoms. The alkyl groups may be substituted by halogen atoms or may remain unsubstituted.

In one embodiment, the surfactant may include at least one compound represented by either Formula 4 or 5:

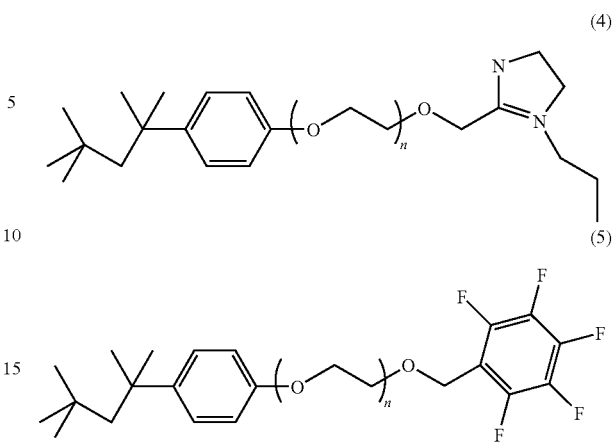

In Formulae 4 and 5, n is an integer ranging from 1 to 100.

The amount of surfactant present in the organic electrolytic solution ranges from about 0.1 to about 15% by weight based on the total weight of the organic solvent.

The concentration of lithium salt in the organic electrolytic solution ranges from about 0.5 to about 2.0 M.

Nonlimiting examples of suitable solvents for use as the first solvent having a high dielectric constant include ethylene carbonate, propylene carbonate, butylene carbonate, γ-butyrolactone and mixtures thereof.

Nonlimiting examples of suitable solvents for use as the second solvent having a low boiling point include dimethyl carbonate, ethylmethyl carbonate, diethyl carbonate, dipropyl carbonate, dimethoxyethane, diethoxyethane, fatty acid ester derivatives and mixtures thereof.

According to another embodiment of the present invention, a lithium battery comprises a cathode, an anode, and the organic electrolytic solution described above.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
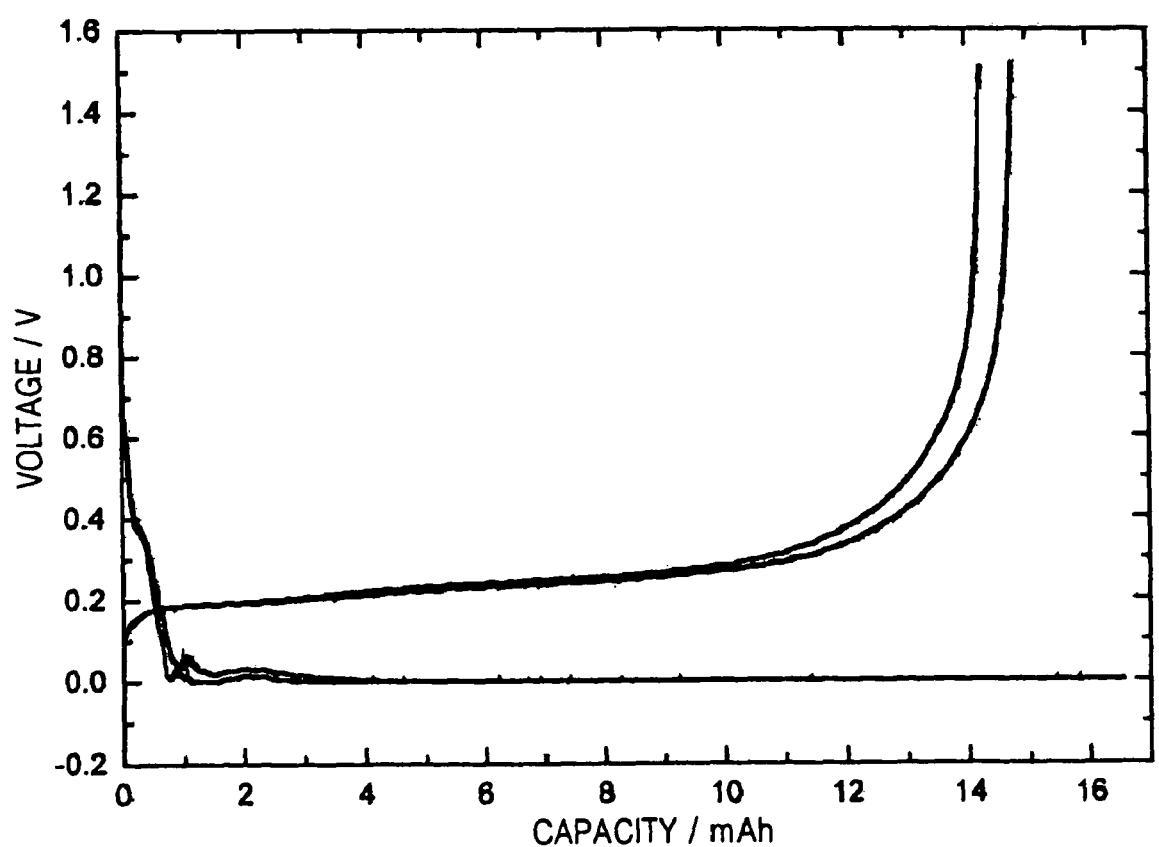
FIG. 1 is a graph illustrating charge/discharge characteristics of lithium batteries employing organic electrolytic solutions according to Example 5 of the present invention.

Hereinafter, the terms "hydrophilic segment" and "hydrophobic segment" refer to an affinity to a solvent rather than to water. Thus, while it would be preferable to use the terms "solvent-philic segment" and "solvent-phobic segment," the terms "hydrophilic segment" and "hydrophobic segment" are used. The technical meaning of these terms are well known in the art and technology to which the present invention pertains.

A typical conventional surfactant includes a hydrophilic segment connected to a hydrophobic segment, and thus has limitations in its affinity to an electrode in a battery interface. Unlike conventional surfactants, the organic surfactant according to one embodiment of the present invention includes a surfactant in which both ends of a hydrophilic segment are connected to hydrophobic segments. Therefore, the surfactant has good affinity to carbon-based anodes in battery systems having nonaqueous electrolytes and carbon-based anodes. The surfactant also shows better surface activity on the interface between the anode and electrolyte, thereby effectively suppressing a side reaction on the anode surface and improving battery reliability.

An organic electrolytic solution according to one embodiment of the present invention includes a lithium salt, an organic solvent comprising a first solvent having a high dielectric constant and a second solvent having a low boiling point, and a surfactant having a hydrophilic segment with two ends, each end being connected to a hydrophobic segment. When such a surfactant is used in a carbon-based anode (such as graphite having a repeating benzene structure), the hydrophobic segments can have excellent affinity to the carbon-based anode since the surfactant has two hydrophobic segments.

The surfactant will now be described in more detail, but the following description is not intended to limit the scope of the present invention. Surfactants tend to adsorb to the interface between two phases having different polarities because the surfactant has hydrophilic and hydrophobic segments within the molecule itself. The surfactant usually has a single hydrophilic segment and a single hydrophobic segment. However, the relative size or polarity of the hydrophilic and hydrophobic segments can be adjusted.

A plurality of hydrophilic and hydrophobic segments can also be included in the surfactant. For example, when a plurality of hydrophobic segments are included in one surfactant, the hydrophobicity of the entire surfactant molecule increases and a unit area of the interface occupied by the surfactant increases since the volume of the hydrophobic segment increases. Thus, the number of hydrophobic segments arranged toward the interface increases and effective adsorption can be achieved even though the surface of the interface is uneven. For example, dioctyl sodium sulfosuccinate ("Aerosol OT"), which includes two hydrophobic segments, has excellent wettability to interfaces having uneven and complicated surfaces even though Aerosol OT does not largely decrease interface tension. Therefore, the organic electrolytic solution according to one embodiment of the present invention creates impregnating pores on the surface of complicated carbon-based anodes with the surfactant. That is, the ability to impregnate an organic electrolytic solution improves. Therefore, interfacial resistance can be decreased by enlarging an effective interface area. Direct contact between the organic electrolytic solution and the anode can be prevented since the hydrophobic segment of the surfactant has excellent affinity to the carbon-based anode having benzene rings. Therefore, by suppressing the side reaction between the electrode and the solvent caused by oxidation/reduction of lithium ions, more charge/discharge can occur.

According to one embodiment, at least one hydrogen atom of the hydrophobic segment of the surfactant may be substituted by a halogen atom or a linear or branched alkyl group having from 1 to 20 carbon atoms. When the alkyl group is used it may be substituted with a halogen atom or remain unsubstituted.

Nonlimiting examples of suitable halogen atoms include F, Cl, Br and I. In one embodiment, F is used as the halogen atom. When the hydrogen atoms are substituted by F, a fluorine-based surfactant is formed. Fluorine-based compounds are known to have low interface tension. Also, when substituted or unsubstituted linear or branched alkyl groups are used, the hydrophobicity, or the structure of the alkyl groups depends on the length of the alkyl groups.

The hydrophobic segment of the surfactant may include an aromatic group. In more detail, the aromatic group of the hydrophobic segment is more electrically stable than a simple cyclic compound since the number of electrons present in a π-orbital, i.e. π-electrons, is 4n+2, in which n is an integer of 1 or more. Thus, the aromatic group has several physical properties different from general cyclic compounds having relatively low chemical reactivity. The π-orbital in the aromatic group is delocalized and when it overlaps a delocalized π-orbital in the surface of graphite, resonance can occur, enabling π-electrons in the π-orbital to be in a broader orbital (i.e., many positions in a space). The increases the number of electron arrangements and thereby forms a more electrically stable structure. That is, when a surfactant having a hydrophobic segment overlaps a carbon-based electrode, it is more stable than a surfactant having an alkyl group in its hydrophobic segment.

Alternatively, in view of electrostatic force, when aromatic benzene rings having similar structures are located close to each other, they easily adsorb due to Van der Waals forces. For this reason, the surfactant is densely and tightly adsorbed to the surface of the carbon-based anode and reacts with solvent molecules through an electrochemical reduction on the anode surface, thereby modifying the SEI on the anode surface. Due to the high density of the surfactant adsorbed to the anode surface, the side reaction between the anode surface and the electrolyte is suppressed, thereby preventing a reduction in the lifespan of the battery due to decomposition of the electrolyte and improving battery reliability.

The aromatic group of the hydrophobic segment may be an aryl group having from 6 to 30 carbon atoms or a heteroaryl group having from 2 to 30 carbon atoms. The aryl group may be used alone or in combination and may be a carbocyclic aromatic system having from 6 to 30 carbon atoms and including one or more rings. The rings may be attached or fused together using a pendent method. The term "homoaryl" includes, but is not restricted to, aromatic radicals such as phenyl, naphthyl, tetrahydronaphthyl, indenyl and biphenyl. In one embodiment, the aryl group is selected from phenyl groups, indenyl groups, naphthalenyl groups, phenanthrenyl groups, anthracenyl groups, and pyrenyl groups.

The heteroaryl group may be a monovalent, monocyclic or bicyclic aromatic radical that has from 2 to 30 carbon atoms and 1, 2 or 3 heteroatoms selected from N, O and S. For example, the heteroaryl group may be a monovalent, monocyclic or bicyclic aromatic radical in which at least one of the heteroatoms is oxidized or quaternarized to form, for example, an N-oxide or a quaternary salt. Nonlimiting examples of suitable heteroaryl groups include thienyl groups, benzothienyl groups, pyridyl groups, pyrazinyl groups, pyrimidinyl groups, pyridazinyl groups, quinolinyl groups, quinoxalinyl groups, imidazolyl groups, furanyl groups, benzofuranyl groups, thiazolyl groups, isoxazolyl groups, benzisoxazolyl groups, benzimidazolyl groups, triazolyl groups, pyrazolyl groups, pyrolyl groups, indolyl groups, 2-pyridonyl groups, 4-pyridonyl groups, N-alkyl-2-pyridonyl groups, pyrazinonyl groups, pyridazynonyl groups, pyrimidinonyl groups, oxazolonyl groups, corresponding N-oxides thereof (e.g., pyridyl N-oxides, quinolinyl N-oxides), and quaternary salts thereof. In one embodiment, the heteroaryl group having from 2 to 30 carbon atoms is selected from pyrrolyl groups, thiophenyl groups, imidazolyl groups, pyrazolyl groups, furanyl groups, isothiazolyl groups, pyranyl groups, isoxazolyl groups, pyridinyl groups, purinyl groups, pyrazinyl groups, quinolizinyl groups, pyrimidinyl groups, quinolinyl groups, pyridazinyl groups, indolyl groups, carbazolyl groups, and phenazilyl groups.

At least one hydrogen atom of the aryl group or the heteroaryl group may be substituted by at least one functional group selected from halogen atoms and alkyl groups having from 1 to 20 carbon atoms. Nonlimiting examples of suitable halogen atoms include F, Cl, Br, and I. In one embodiment, F is used.

When hydrogen atoms of the aryl group or the heteroaryl group are substituted by F, a fluorine-based surfactant is formed. Fluorine-based compounds are known to have low surface tension (e.g., Teflon) and the fluorine-based surfactant also has also enhanced surface tension reducing abilities. Thus, adsorption of the fluorine-based surfactant at the interface between the carbon-based anode and the polar solvent occurs more easily. When halogen atoms are used, the number of valence electrons increases and the orbital volume increases, thus activating the interaction of halogen atoms with an edge plane. As a result, they are effectively adsorbed to the carbon-based anode, which ensures blockage of the electrolyte. Accordingly, the irreversible decomposition of a solvent at a first charge/discharge cycle can be more effectively suppressed than when the (hetero)aryl group has only hydrogen atoms.

The hydrophilic segment of the surfactant may include an alkoxycarbonyl group (RO—(C=O)—), a carboxy group (HO—(C=O)—), a carbonyl group (—(C=O)—), a dithiocarboxy group (HS—(C=S)—), a thiocarboxy group (HO—(C=S)—), a hydroxy group (HO—) or an oxyalkylene group (—$R^1$-O—). In the hydrophilic segment, the alkyl group (R—) may include a linear or branched radical having from 1 to 20 carbon atoms. In one embodiment, the alkyl group is a linear or branched radical having from 1 to 12 carbon atoms. In another embodiment, the alkyl radical is a lower alkyl having from 1 to 8 carbon atoms. Nonlimiting examples of suitable alkyl radicals include methyl, ethyl, n-propyl, isopropyl, n-butyl, isobutyl, sec-butyl, t-butyl, pentyl, iso-amyl, hexyl, etc. A lower alkyl radical having from 1 to 5 carbon atoms can also be used.

In the hydrophilic segment, the alkylene group (—$R^1$—) may include a linear or branched radical having from 2 to 20 carbon atoms. In one embodiment, the alkylene group is a linear or branched radical having from 2 to 10 carbon atoms. In another embodiment, the alkylene radical is a lower alkyl having from 2 to 8 carbon atoms. Nonlimiting examples of suitable alkylene radicals include ethylene, n-propylene, isopropylene, n-butylene, isobutylene, sec-butylene, t-butylene, pentylene, iso-amylene, hexylene, etc. A lower alkylene radical having from 1 to 5 carbon atoms can also be used.

In one embodiment, the surfactant is represented by any one of the following Formulae 1 to 3:

Y-[A]$_a$-X (1)

Y-[A]$_a$-[B]$_b$-X (2)

Y-[A]$_a$-[B]$_b$-[C]$_c$-X (3).

In Formulae 1 to 3, each of X and Y is a (hetero)aryl group. In one embodiment, each of X and Y is either phenyl or imidazolyl. Each of A, B and C is a repeating unit selected from oxyethylene, oxypropylene oxybutylene,

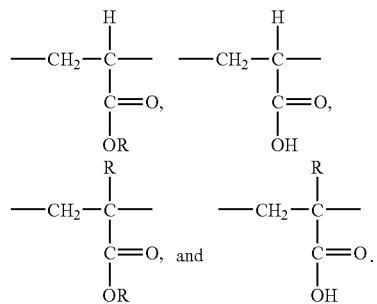

Each of a, b, and c is an integer ranging from 1 to 100, and R is the alkyl group (R—) described above with respect to the hydrophilic segment of the surfactant.

At least one hydrogen atom of each of X and Y may be substituted by at least one functional group selected from halogen atoms and alkyl groups having from 1 to 20 carbon atoms. The halogen atom may be F, Cl, Br, or I. In one embodiment, the halogen atom is F.

In one embodiment, the surfactant may be selected from compounds represented by the following Formulae 4 and 5.

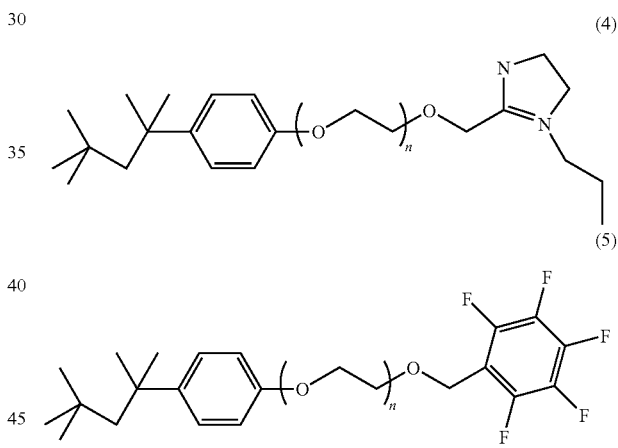

In Formulae 4 and 5, n is an integer ranging from 1 to 100.

The amount of the surfactant used may range from about 0.1 to about 15% by weight based on the total weight of the organic solvent. In one embodiment, the amount of surfactant used ranges from about 8 to about 12% by weight based on the total weight of the organic solvent. When the amount of the surfactant exceeds about 15% by weight, the charge/discharge characteristics become poor since the amount of effective material on which the performance of the battery depends is insufficient. When the amount of the surfactant is less than about 0.1% by weight, the desired effects are not sufficiently obtained.

The first solvent having a high dielectric constant may be any such solvent commonly used in the art. Nonlimiting examples of suitable first solvents include γ-butyrolactone and cyclic carbonates, such as ethylene carbonate, propylene carbonate, butylene carbonate, etc.

Similarly, the second solvent having a low boiling point may be any such solvent commonly used in the art. Nonlimiting examples of suitable second solvents include dimethoxyethane, diethoxyethane, fatty acid ester derivatives, aliphatic carbonates, such as dimethyl carbonate, ethylmethyl carbonate, diethyl carbonate and dipropyl carbonate, etc.

The volumetric ratio of the first solvent having a high dielectric constant to the second solvent having a low boiling point ranges from about 1:1 to about 1:9. When the ratio is outside this range, the discharge capacity and charge/discharge cycle life of the battery may decrease.

The lithium salt may be any lithium salt that is commonly used in lithium batteries. Nonlimiting examples of suitable lithium salts include $LiClO_4$, $LiCF_3SO_3$, $LiPF_6$, $LiN(CF_3SO_2)$, $LiBF_4$, $LiC(CF_3SO_2)_3$, $LiN(C_2F_5SO_2)_2$, and mixtures thereof.

The concentration of the lithium salt in the organic electrolytic solution ranges from about 0.5 to about 2.0 M. When the concentration of the lithium salt is less than about 0.5 M, the conductivity of the electrolytic solution becomes low, thereby degrading the performance of the electrolytic solution. When the concentration of the lithium salt is greater than about 2.0 M, the viscosity of the electrolytic solution increases, thereby reducing the mobility of lithium ions.

A lithium battery employing the organic electrolytic solution and a method of manufacturing the same will now be described.

Figure 2:
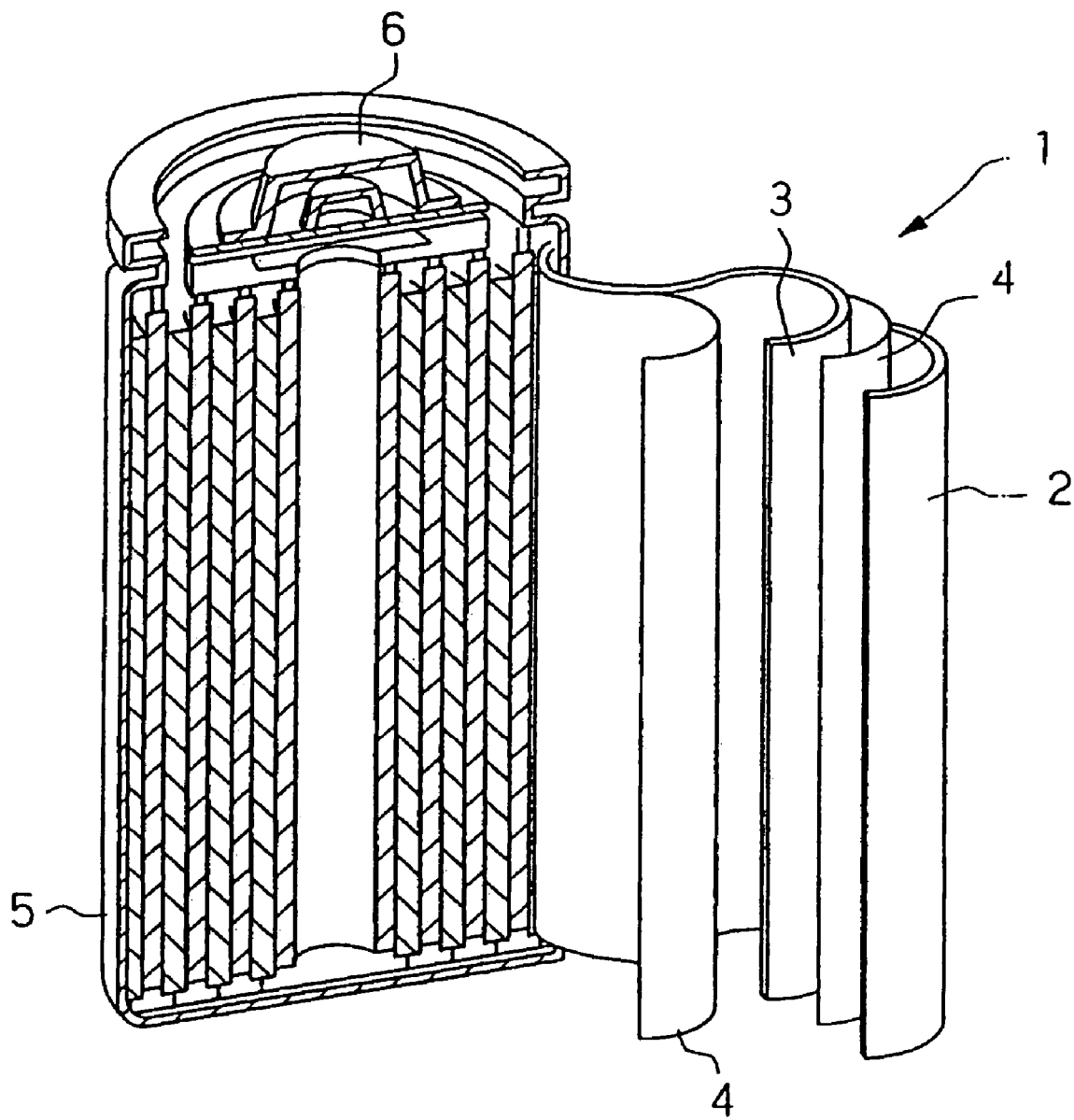
FIG. 2 is perspective schematic view of a lithium battery according to one embodiment of the present invention.

As shown in FIG. 2, a lithium battery 1 according to one embodiment of the present invention includes a cathode 2, an anode 3, and an organic electrolytic solution (not shown) described above.

The lithium battery is not particularly restricted and may be a lithium primary battery or a lithium secondary battery such as a lithium ion battery, a lithium ion polymer battery, or a lithium sulfur battery.

In one embodiment of the present invention, a lithium battery is manufactured by first mixing a cathode active material, a conducting agent, a binder and a solvent to prepare a cathode active material composition. The cathode active material composition is directly coated on an Al current collector and dried to prepare a cathode plate. Alternatively, the cathode active material composition is cast on a separate substrate and a film obtained therefrom is laminated on an Al current collector to prepare a cathode plate.

The cathode active material may be any lithium containing metal oxide commonly used in the art. Nonlimiting examples of suitable cathode active materials include $LiCoO_2$, $LiMn_xO_{2x}$, $LiNi_{1-x}Mn_xO_{2x}$ (where x is 1), $Ni_{1-x-y}Co_xMn_yO_2$ (where $0 \leq x \leq 0.5$ and $0 \leq y \leq 0.5$), etc.

One nonlimiting example of a suitable conducting agent is carbon black.

Nonlimiting examples of suitable binders include vinylidene fluoride/hexafluoropropylene copolymers, polyvinylidene fluoride, polyacrylonitrile, polymethylmethacrylate, polytetrafluoroethylene, and mixtures thereof. Styrene butadiene rubber-based polymers may also be used as the binder.

Nonlimiting examples of suitable solvents include N-methylpyrrolidone, acetone, water, etc. The amounts of the cathode active material, the conducting agent, the binder and the solvent are those commonly used in lithium batteries.

An anode active material, a conducting agent, a binder and a solvent are then mixed to prepare an anode active material composition. The anode active material composition is directly coated on a Cu current collector to obtain an anode plate. Alternatively, the anode active material composition is cast on a separate substrate and an anode active material film obtained therefrom is laminated on a Cu current collector to obtain an anode plate. Amounts of the anode active material, the conducting agent, the binder and the solvent are those commonly used in lithium batteries.

Lithium metal, lithium alloys, carbonaceous materials or graphite may be used as the anode active material. The conducting agent, the binder and the solvent in the anode active material composition are the same as those in the cathode active material composition described above.

If desired, a plasticizer may be added to the cathode active material composition and the anode active material composition to produce pores inside the electrode plates.

The battery 1 also includes a separator 4, which may comprise any material commonly used in lithium batteries. In one embodiment, the separator comprises a material having low resistance to movement of ions of the electrolyte and a good ability to absorb the electrolytic solution. For example, the separator material may be a non-woven or woven fabric of glass fiber, polyester, Teflon, polyethylene, polypropylene, polytetrafluoroethylene (PTFE) or a combination thereof. More specifically, a lithium ion battery may use a windable separator composed of polyethylene, polypropylene, etc., and a lithium ion polymer battery may use a separator having the ability to impregnate an organic electrolytic solution.

The separator is prepared by first mixing a polymer resin, a filler and a solvent to prepare a separator composition. The separator composition is directly coated on an electrode and dried to form a separator film. Alternatively, the separator composition may be cast on a separate substrate and dried to form a film which is then removed from the substrate and laminated on an electrode.

The polymer resin is not particularly restricted and can be any conventional material used as a binder for an electrode plate. Nonlimiting examples of suitable polymer resins include vinylidenefluoride/hexafluoropropylene copolymers, polyvinylidenefluoride, polyacrylonitrile, polymethylmethacrylate and mixtures thereof. In one embodiment, vinylidenefluoride/hexafluoropropylene copolymer containing from about 8 to about 25% by weight of hexafluoropropylene is used.

The separator 4 is positioned between the cathode plate 2 and the anode plate 3 to form an electrode assembly. The electrode assembly is wound or folded and placed in a cylindrical or rectangular battery case 5. Then, the battery case 5 is sealed with a cap assembly 6 and the organic electrolytic solution according to the present invention is injected into the battery case 5 to complete the lithium ion battery.

Alternatively, the electrode assembly is prepared in the form of a bicell and the organic electrolytic solution according to the present invention is impregnated therein. The resulting assembly is then placed in a pouch and sealed to complete a lithium ion polymer battery.

The present invention will now be described in greater detail with reference to the following examples. However, it is understood that the following examples are presented for illustrative purposes only and are not intended to limit the scope of the present invention. The experiments of the Examples and Comparative Examples were repeated twice under the same conditions.

EXAMPLE 1

Preparation of Electrolytic Solution

10% by weight of the compound represented by Formula 10 below was added as an additive to an organic solvent mixture containing 30% by volume of propylene carbonate and 70% by volume of dimethyl carbonate. 1M LiPF$_6$ was used as the lithium salt to prepare an organic electrolytic solution.

(10)

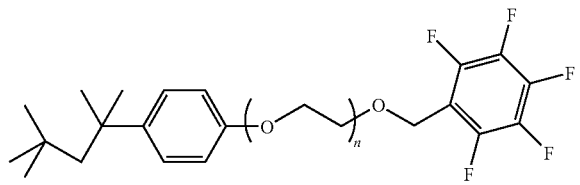

In Formula 10, n is 10.

EXAMPLE 2

Preparation of Electrolytic Solution

An organic electrolytic solution was prepared as in Example 1, except that 0.5% by weight of the compound represented by Formula 10 was used.

EXAMPLE 3

Preparation of Electrolytic Solution

An organic electrolytic solution was prepared as in Example 1, except that 1% by weight of the compound represented by Formula 10 was used.

EXAMPLE 4

Preparation of Electrolytic Solution

An organic electrolytic solution was prepared as in Example 1, except that 5% by weight of the compound represented by Formula 10 was used.

COMPARATIVE EXAMPLE 1

Preparation of Electrolytic Solution

1% by weight of the compound represented by Formula 11 was added as an additive to an organic solvent mixture containing 30% by volume of propylene carbonate and 70% by volume of dimethyl carbonate. 1M LiPF$_6$ was used as a lithium salt to prepare an organic electrolytic solution.

(11)

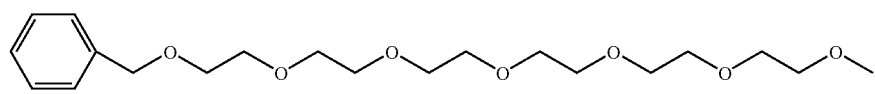

COMPARATIVE EXAMPLE 2

Preparation of Electrolytic Solution

An organic electrolytic solution was prepared as in Comparative Example 1, except that 5% by weight of the compound represented by Formula 11 was used.

COMPARATIVE EXAMPLE 3

Preparation of Electrolytic Solution

An organic electrolytic solution was prepared as in Comparative Example 1, except that 10% by weight of the compound represented by Formula 11 was used.

COMPARATIVE EXAMPLE 4

Preparation of Electrolytic Solution

An organic electrolytic solution was prepared as in Comparative Example 1, except that 1% by weight of the compound represented by Formula 12 was used.

(12)

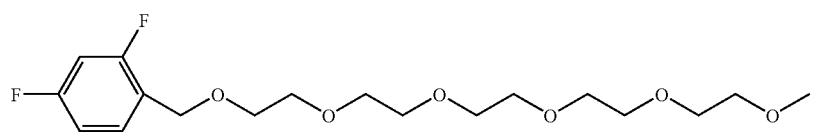

COMPARATIVE EXAMPLE 5

Preparation of Electrolytic Solution

An organic electrolytic solution was prepared as in Comparative Example 1, except that 5% by weight of the compound represented by Formula 12 was used.

COMPARATIVE EXAMPLE 6

Preparation of Electrolytic Solution

An organic electrolytic solution was prepared as in Comparative Example 1, except that 10% by weight of the compound represented by Formula 12 was used.

EXAMPLE 5

Manufacturing of Half-cell

96% by weight of a graphite-based powder (NICABEAD, available from Nippon Carbon Co., Ltd., average particle diameter: 25 μm) as an active material, 4% by weight of PVdF as a binder and 100 ml of NMP (N-methylpyrrolidone) were mixed. Then, ceramic balls were placed in the mixture and the resulting mixture was blended for about 10 hours. The mixture was cast on a 19 μm thick Cu foil at intervals of 300 μm with a doctor blade to obtain a carbon-based electrode. The carbon-based electrode was placed in an oven at 90° C. and dried for about 10 hours to thoroughly evaporate the NMP. Then, the electrode was roll-pressed to obtain a 120 μm thick carbon-based electrode.

Lithium was used to form a counter electrode.

A 20 μm thick polyethylene/polypropylene microporous membrane (Hoest Chellanese, USA) was used as a separator. The separator was positioned between electrodes. The resulting structure was pressed and placed into a can. Then, the electrolytic solution prepared as in Example 1 was injected into the can to prepare a half-cell.

EXAMPLE 6

Manufacturing of Half-cell

A half-cell was prepared as in Example 5, except that the electrolytic solution prepared as in Example 2 was used.

EXAMPLE 7

Manufacturing of Half-cell

A half-cell was prepared as in Example 5, except that the electrolytic solution prepared as in Example 3 was used.

EXAMPLE 8

Manufacturing of Half-cell

A half-cell was prepared as in Example 5, except that the electrolytic solution prepared as in Example 4 was used.

COMPARATIVE EXAMPLE 7

Manufacturing of Half-cell

A half-cell was manufactured as in Example 5, except that the organic electrolytic solution prepared as in Comparative Example 1 was used.

COMPARATIVE EXAMPLE 8

Manufacturing of Half-cell

A half-cell was manufactured as in Example 5, except that the organic electrolytic solution prepared as in Comparative Example 2 was used.

COMPARATIVE EXAMPLE 9

Manufacturing of Half-cell

A half-cell was manufactured as in Example 5, except that the organic electrolytic solution prepared as in Comparative Example 3 was used.

COMPARATIVE EXAMPLE 10

Manufacturing of Half-cell

A half-cell was manufactured as in Example 5, except that the organic electrolytic solution prepared as in Comparative Example 4 was used.

COMPARATIVE EXAMPLE 11

Manufacturing of Half-cell

A half-cell was manufactured as in Example 5, except that the organic electrolytic solution prepared as in Comparative Example 5 was used.

COMPARATIVE EXAMPLE 12

Manufacturing of Half-cell

A half-cell was manufactured as in Example 5, except that the organic electrolytic solution prepared as in Comparative Example 6 was used.

EXPERIMENTAL EXAMPLE

Charge/Discharge Characteristics of Battery

The Li electrodes of the half-cells prepared according to Examples 5 to 8 and Comparative Examples 7 to 12 were charged with a constant current of 50 mA per 1 g of the active material until the cells reached 0.001 V. Then, a constant voltage charging was performed until the current was reduced to 5 mA per 1 g of the active material at a voltage of 0.001 V. The results are illustrated in Table 1. A charge/discharge graph of the results of the half-cell according to Example 5 is illustrated in FIG. 1 (Experiments were performed twice).

TABLE 1

| | Li charge (mAh) | Li discharge (mAh) | Efficiency (%) | Li charge (mAh) | Li discharge (mAh) | Efficiency (%) |
|---|---|---|---|---|---|---|
| Example 5 | 15.98 | 14.25 | 89.2 | 16.53 | 14.76 | 89.3 |
| Example 6 | 18.03 | 10.75 | 58.7 | 19.82 | 11.21 | 56.5 |
| Example 7 | 16.49 | 11.77 | 71.4 | 17.28 | 11.51 | 66.6 |
| Example 8 | 15.92 | 13.73 | 86.2 | 16.21 | 13.59 | 83.8 |
| Comparative Example 7 | 25.27 | 16.06 | 63.6 | 24.66 | 15.43 | 62.6 |
| Comparative Example 8 | 20.57 | 13.85 | 67.3 | 21.146 | 14.4 | 68.1 |
| Comparative Example 9 | 15.94 | 10.85 | 68.1 | 17.3 | 12.2 | 70.5 |
| Comparative Example 10 | 21.96 | 14.5 | 66.0 | 8.85 | 3.09 | 34.9 |
| Comparative Example 11 | 17.84 | 15.22 | 85.3 | 17.86 | 15.19 | 85.1 |
| Comparative Example 12 | 17.98 | 14.67 | 81.6 | 18.71 | 15.24 | 81.5 |

Referring to Table 1, the half-cells of Comparative Examples 7 to 12 using surfactants having one hydrophilic segment and one hydrophobic segment have a maximum discharge efficiency of 85%. On the contrary, the half-cells of Examples 5 to 8 have a maximum discharge efficiency of about 90%. The difference in initial discharge efficiencies is considered to be caused by the effective prevention of contact between the electrode and the polar solvent, thereby substantially suppressing the side reaction due to the effective adsorption to the interface of the plurality of hydrophobic segments. Although the 5% difference in maximum discharge efficiency between the Examples and the Comparative Examples may not seem to be a big difference, obtaining a discharge efficiency over 90% is very important in the mass-production of batteries.

The organic electrolytic solutions and lithium batteries according to the present invention effectively prevent the electrolytic solution from contacting the anode to thereby suppress the side reaction on the anode surface. Thus, discharge capacity, charge/discharge efficiency, lifespan, and battery reliability are improved.

While the present invention has been illustrated and described with reference to certain exemplary embodiments, it is understood by those of ordinary skill in the art that various alterations and modifications may be made to the described embodiments without departing from the spirit and scope of the present invention as defined by the following claims.

What is claimed is:

1. An organic electrolytic solution comprising:
   a lithium salt;
   an organic solvent comprising a first solvent and a second solvent, the first solvent having a high dielectric constant and the second solvent having a low boiling point; and
   a surfactant comprising a hydrophilic segment having two ends, each end being connected to a hydrophobic segment, wherein the surfactant is selected from the group consisting of compounds represented by Formulae 1 to 3:

   $$Y\text{-}[A]_a\text{-}X \quad (1)$$

   $$Y\text{-}[A]_a\text{-}[B]_b\text{-}X \quad (2)$$

   $$Y\text{-}[A]_a\text{-}[B]_b\text{-}[C]_c\text{-}X \quad (3)$$

where each of X and Y is a (hetero)aryl group selected from the group consisting of phenyl and imidazolyl, each of A, B, and C is a repeating unit selected from the group consisting of oxyethylene, oxypropylene, oxybutylene,

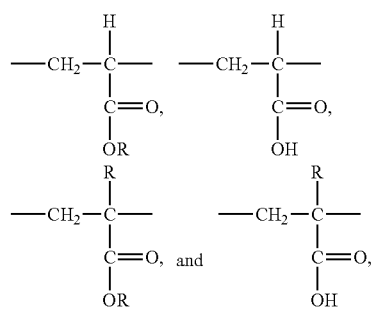

each of a, b, and c is an integer ranging from 1 to 100, and R is a linear or branched alkyl group having from 1 to 20 carbon atoms.

2. The organic electrolytic solution of claim 1, wherein at least one hydrogen atom of at least one of X or Y is substituted by a functional group selected from the group consisting of halogen atoms, unsubstituted linear alkyl groups having from 1 to 20 carbon atoms, unsubstituted branched alkyl groups having from 1 to 20 carbon atoms, linear alkyl groups having from 1 to 20 carbon atoms in which at least one hydrogen atom of the alkyl group is substituted by a halogen atom, branched alkyl groups having from 1 to 20 carbon atoms in which at least one hydrogen atom of the alkyl group is substituted by a halogen atom, and mixtures thereof.

3. The organic electrolytic solution of claim 2, wherein the at least one hydrogen atom of at least one of X or Y is substituted by a F atom.

4. An organic electrolytic solution comprising:
   a lithium salt;
   an organic solvent comprising a first solvent and a second solvent, the first solvent having a high dielectric constant and the second solvent having a low boiling point; and
   a surfactant comprising a hydrophilic segment having two ends, each end being connected to a hydrophobic segment, wherein the surfactant comprises a compound selected from the group consisting of compounds represented by Formulae 4 and 5:

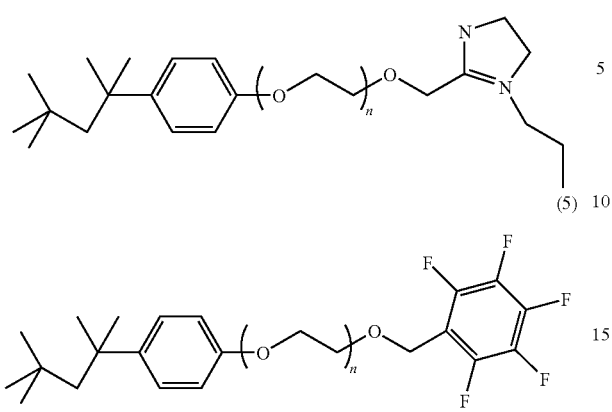

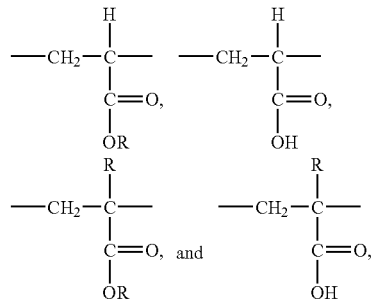

where n is an integer ranging from 1 to 100.

5. The organic electrolytic solution of claim 1, wherein the surfactant is present in an amount ranging from about 0.1 to about 15% by weight based on the total weight of the organic solvent.

6. The organic electrolytic solution of claim 1, wherein the concentration of the lithium salt ranges from about 0.5 to about 2.0 M.

7. The organic electrolytic solution of claim 1, wherein the first solvent is selected from the group consisting of ethylene carbonate, propylene carbonate, butylene carbonate, γ-butyrolactone and mixtures thereof.

8. The organic electrolytic solution of claim 1, wherein the second solvent is selected from the group consisting of dimethyl carbonate, ethylmethyl carbonate, diethyl carbonate, dipropyl carbonate, dimethoxyethane, diethoxyethane, fatty acid ester derivatives and mixtures thereof.

9. A lithium battery comprising:
a cathode;
an anode; and
an organic electrolytic solution comprising:
  a lithium salt;
  an organic solvent comprising a first solvent and a second solvent, the first solvent having a high dielectric constant and the second solvent having a low boiling point; and
  a surfactant comprising a hydrophilic segment having two ends, each end being connected to a hydrophobic segment, wherein the surfactant is selected from the group consisting of compounds represented by Formulae 1 to 3:

where each of X and Y is a (hetero)aryl group selected from the group consisting of phenyl and imidazolyl, each of A, B, and C is a repeating unit selected from the group consisting of oxyethylene, oxypropylene, oxybutylene,

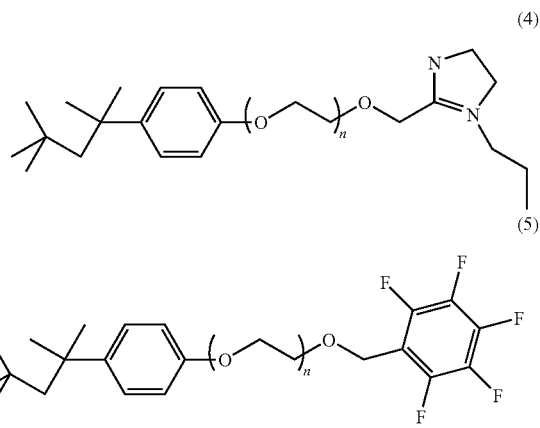

each of a, b, and c is an integer ranging from 1 to 100, and R is a linear or branched alkyl group having from 1 to 20 carbon atoms.

10. A lithium battery comprising:
a cathode;
an anode; and
an organic electrolytic solution comprising:
  a lithium salt;
  an organic solvent comprising a first solvent and a second solvent, the first solvent having a high dielectric constant and the second solvent having a low boiling point; and
  a surfactant comprising a hydrophilic segment having two ends, each end being connected to a hydrophobic segment, wherein the surfactant comprises a compound selected from the group consisting of compounds represented by Formulae 4 and 5:

where n is an integer ranging from 1 to 100.

* * * * *